May 21, 1929.  F. D. WILSON  1,714,152
FRONT POWER PLANT ROAD GRADER
Filed July 2, 1926   5 Sheets-Sheet 3
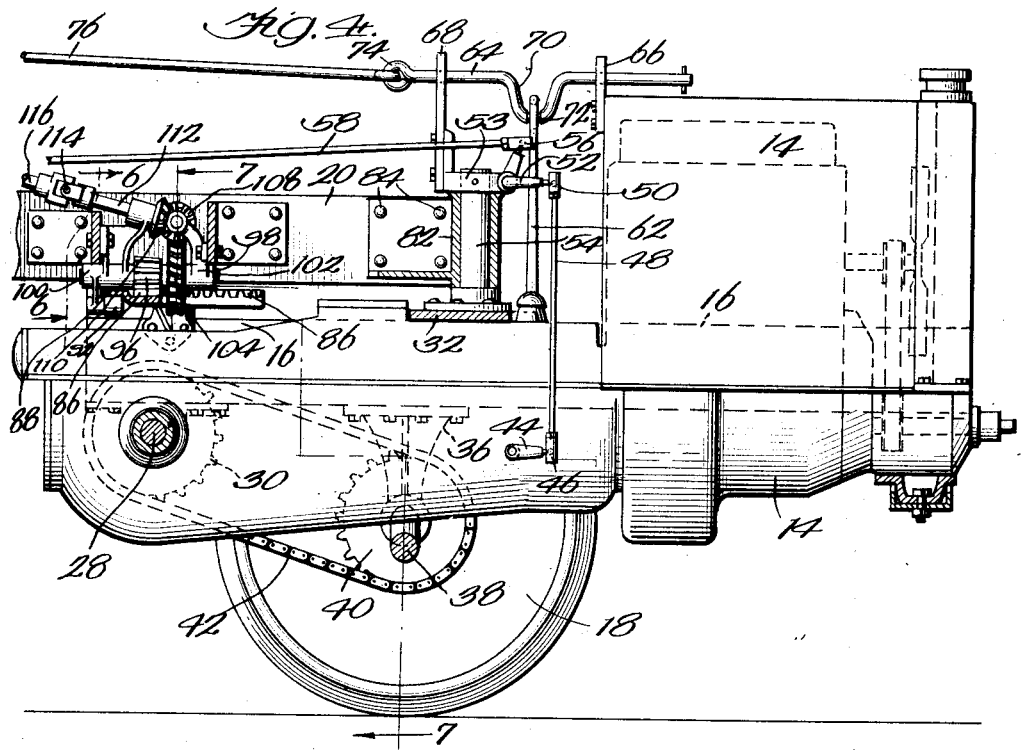
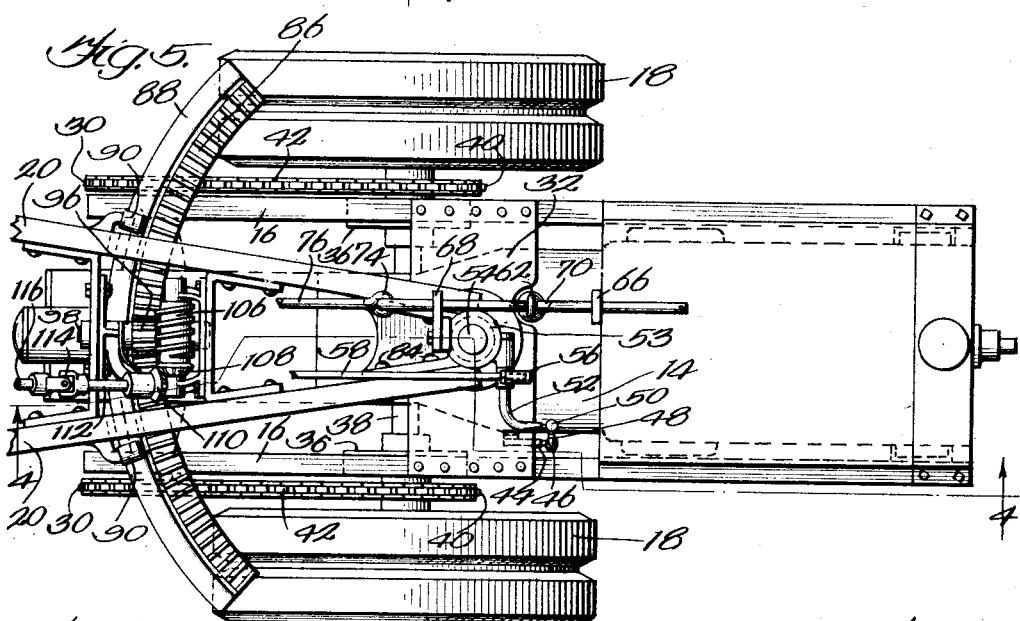

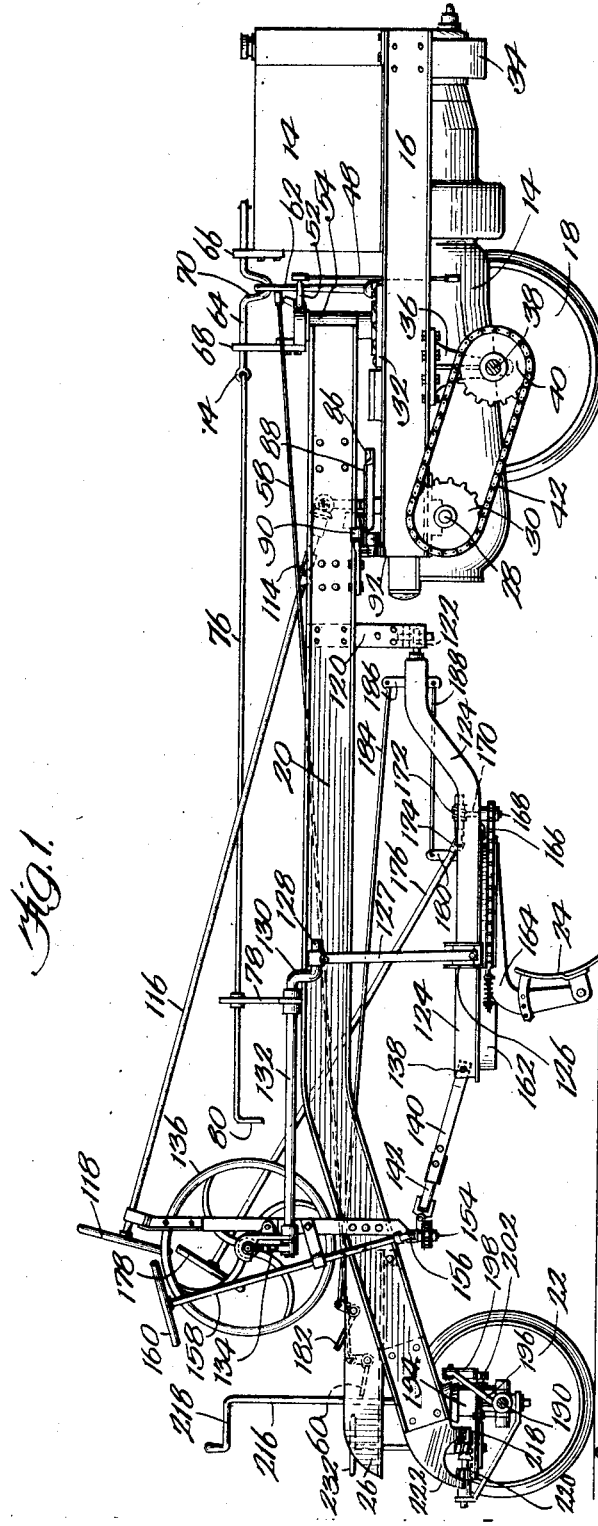

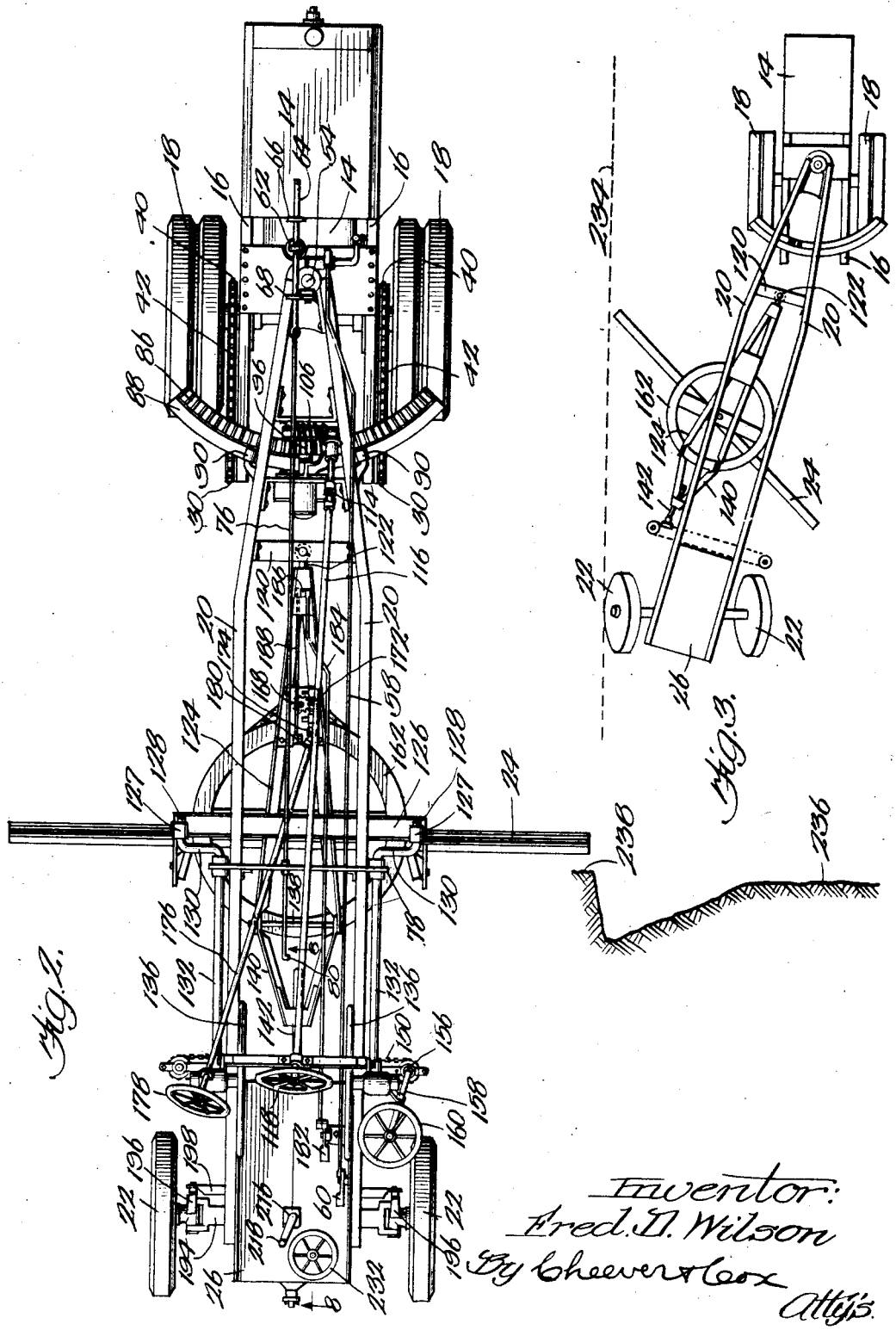

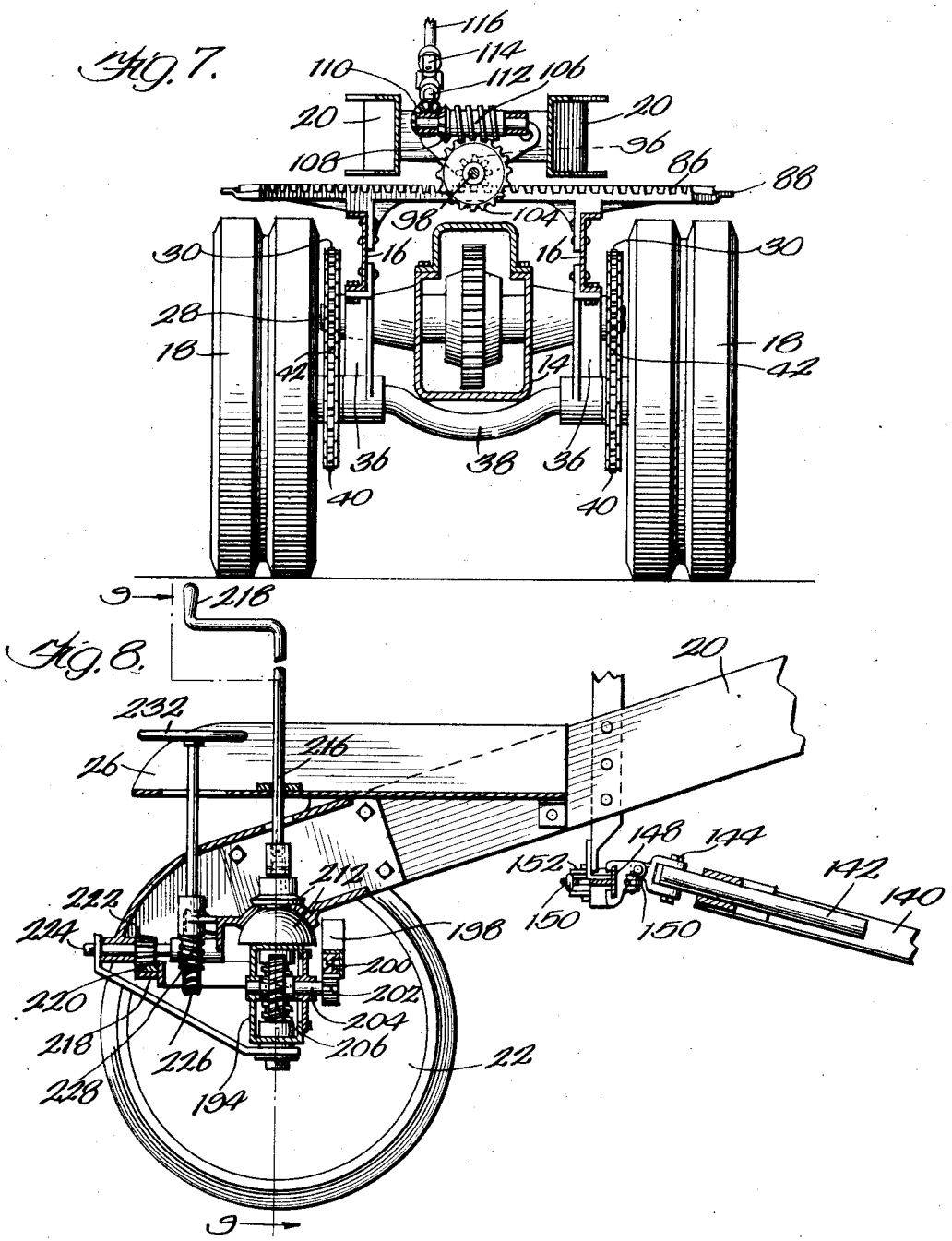

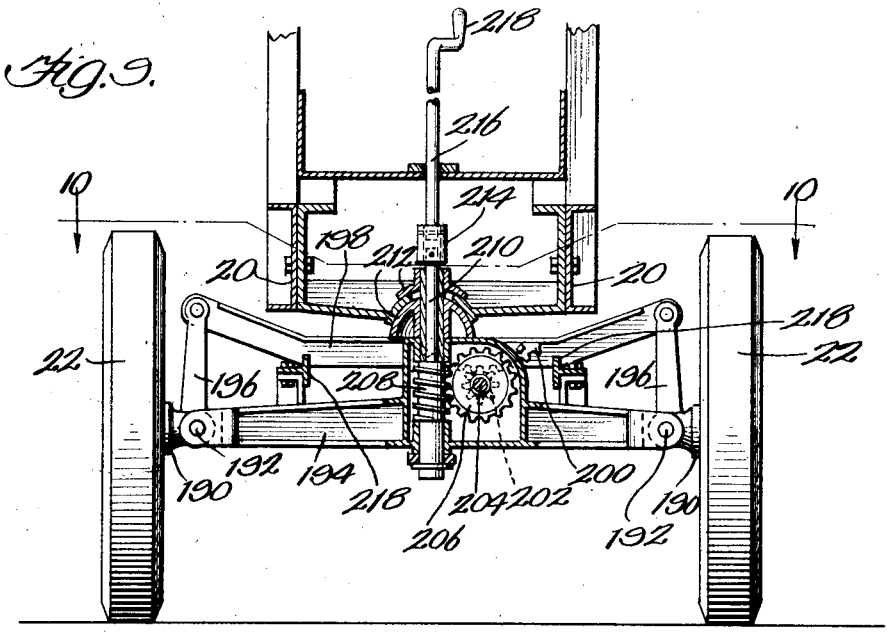
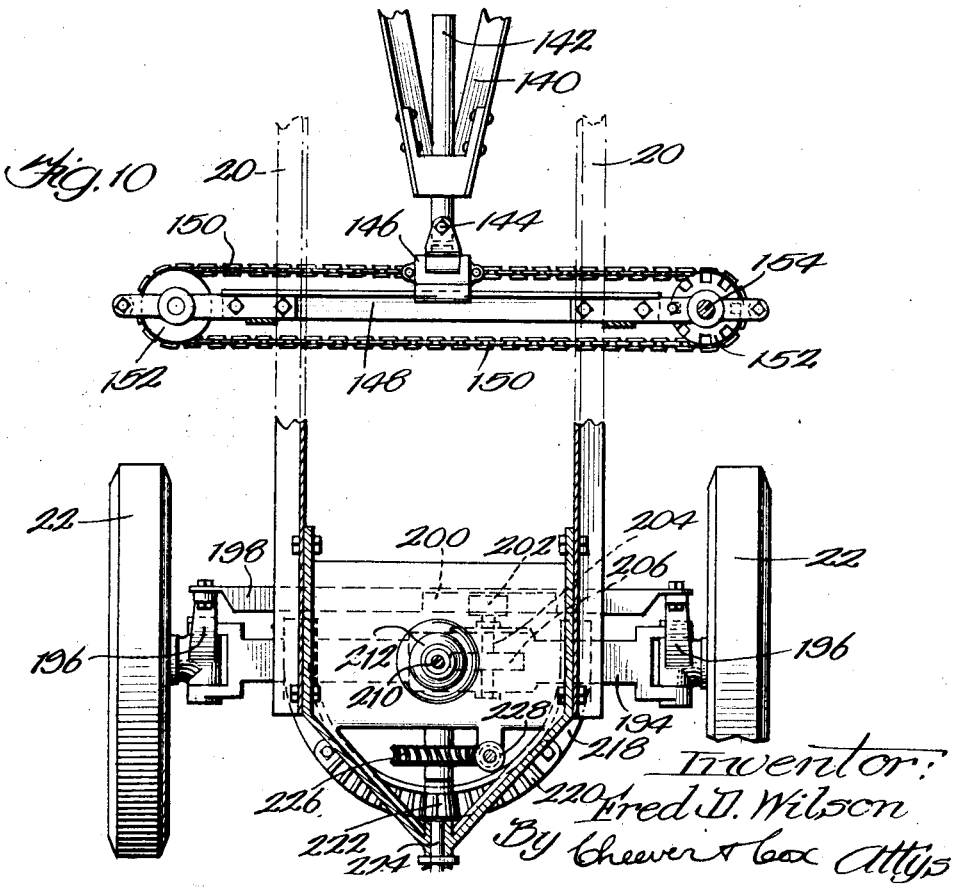

Patented May 21, 1929.

1,714,152

UNITED STATES PATENT OFFICE.

FRED D. WILSON, OF HARVEY, ILLINOIS, ASSIGNOR TO AUSTIN MANUFACTURING CO., OF CHICAGO, ILLINOIS, A CORPORATION OF ILLINOIS.

FRONT-POWER-PLANT ROAD GRADER.

Application filed July 2, 1926. Serial No. 120,035.

This invention relates to power driven road grading machines. Its general object is to provide a machine with which, because of the power plant being located at the front of the machine, the main frame being angularly tiltable in a horizontal plane with reference to the power plant; the rear wheels being both skewable in a horizontal plane and tiltable in a vertical plane; and the blade, itself, located intermediate of the frame having a variety of adjustments, much more efficient and satisfactory road scraping and grading work can be done than with previously known devices.

The invention consists in mechanism capable of attaining the foregoing and other objects; which can be comparatively easily and cheaply made; which is highly satisfactory in operation and not readily liable to get out of order.

More particularly the invention consists in novel means of converting an ordinary commercial tractor engine, specifically a Fordson tractor engine, for use in a machine of this class, and in numerous other features and details of construction hereafter more fully set forth in the specification and claims.

Referring to the drawings in which like numerals designate the same parts throughout the several views:

Figure 1 is a side elevation of a machine illustrating this invention in its preferred form, Figure 2 is a plan view of the structure of Figure 1.

Figure 3 is a diagrammatic, changed position view of the mechanism of Figure 1, showing the manner of using the device in inclined road surface or ditch building.

Figure 4 is an enlarged, detailed side view of the power plant mechanism being approximately the right hand half of Figure 1, the same taken on the irregular line 4—4 of Fig. 5.

Figure 5 is a plan view of the mechanism of Figure 4, a few rods being broken away.

Figure 6 is a detail, sectional end view of the connection between the grader frame and the power plant frame taken on the line 6—6 of Figure 4.

Figure 7 is a detail end view taken on the line 7—7 of Figure 4.

Figure 8 is a central, sectional side detail view on the line 8—8 of Figure 2.

Figure 9 is a detail end view on the line 9—9 of Figure 8.

Figure 10 is a detail, plan view on the line 10—10 of Figure 9.

In general terms, the machine of this invention includes a front commercial tractor engine-power plant 14, equipped with a supplemental frame 16 carrying mechanism through which the power plant drives a pair of front wheels 18; a grader frame 20, pivotally connected to the power plant 14, and its frame 16, the rear end of the frame 20 being supported on steerable and laterally tiltable rear wheels 22, there being mounted under the frame 20 and between the front and rear wheels a road working blade 24 having all the various adjustments common to road grading machines, said adjustments and all other adjustments of the machine, including the starting, stopping and gear shifting of the engine in the power plant being operable by one operator standing on his station platform 26 at the rear of the machine.

While, obviously, a special engine may be built for use in connection with this invention, most economical results as at present known are attained by removing from a commercial Fordson tractor its front axle and all its wheels, leaving the power plant 14 intact and the rear driving axle 28 free for the attachment at opposite end of a sprocket wheel 30 of conventional construction. The power plant 14 is then supplied with power plant frame 16, heretofore referred to, the same including parallel side bars as shown, connected at the middle by a heavy plate 32 and at the front end by a depending, curved strap 34 passing under the forward end of the power plant, the various parts of frame 16 being rigidly secured to the power plant 14 by any other suitable means required, not shown in detail.

Rigidly depending from each side of the power plant frame 16 is a bracket 36 carrying a stationary shaft 38 curved, if required, as shown in Figure 7, to pass under an otherwise obstructing case of the power plant 14. The front wheels 18 are journaled on this shaft 38 and rigid with each such wheel is a sprocket wheel 40 in the same vertical plane as the adjacent sprocket wheel 30. Each set of sprocket wheels 30 and 40 are operatively connected by sprocket chain 42 so that power generated by engine-power plant 14, delivered at shaft 28, is communicated to front wheels 18. Brackets 36 are so positioned that shaft 38 lies across the vertical plane of the center of gravity of the power plant 14 with the result that the power plant is as nearly as possible balanced on the wheels 18 without substantial inclination to tilt down either in front or at the back of said shaft. The engine and power plant 14 has a clutch, not shown, operable by a conventional form of a lever 44 on the side of the power plant. The swinging end of this clutch lever 44 is connected by a ball joint 46 to a vertically extending rod 48 in turn connected by ball joint 50 to one arm of a bell crank 52 pivotally connected to a collar 53 rigidly secured to the upper end of column 54, rigidly connected, as shown, to frame plate 32. The other arm of bell crank 52 is connected through a ball joint 56 to a horizontally rearwardly extending rod 58 leading to clutch pedal 60 conveniently located at the operator's station 26.

Through the mechanism described, the operator can, by properly pressing upon clutch pedal 60 at his station manipulate the engine clutch within power plant 14 immediately connected to lever 44. The ball joints 46, 50 and 56 allow the rod 58 to accommodate itself in the angular adjustment of the machine illustrated in Figure 3 and hereafter more fully described.

The engine within power plant 14 necessarily has a gear shift mechanism, not shown, operated by a conventional upstanding gear shift lever 62. Means for conventionally operating this gear shift lever from the operator's station at the rear of the machine includes a shaft 64 rotatably and longitudinally reciprocal in stationary members 66 and 68 rising respectively from the hood of the power plant 14 and from collar 53. This shaft 64 is provided intermediate of its length with a crank arm 70 having at its middle a crank pin 72, operatively connected to gear shift lever 62, with the result that when shaft 64 is rocked, gear shift lever 62 is conventionally rocked in a vertical plane crosswise of the power plant. The construction is also such that when lever 62 has been so rocked to either extreme position and shaft 64 is then reciprocated lengthwise of the power plant, the lever is correspondingly reciprocated as may be required to shift from reverse position to slow forward position and at the other end of the crosswise stroke of the lever 62 from intermediate gear position to high gear position. The left-hand end of shaft 64 is operatively connected through a suitable joint 74 to a horizontally disposed rod 76, rotatably mounted at its free end in suitable support 78 rising from frame 20. The extreme rear end of the rod is provided with a manipulating handle 80 within reach of the operator at station 26 from which position the operator can, by selectively rotating and reciprocating handle 80 and consequently rod 76, properly shift the gears of the engine within power plant 14.

Column 54 heretofore referred to, is in fact a vertical shaft embraced by a bearing 82 rigidly connected by any suitable means, such, for instance, as bolts 84, to the front end of main grader frame 20, the side members of the frame converging, as shown in Figure 2, for this purpose. It is on this vertical bearing 54 that the frame 20 and associated parts swing to angular position, such as that shown in Figure 3. In order to forcibly effect desired angular, horizontal adjustment of the main grader frame 20 with reference to the power plant, the frame 16 of the latter is rigidly equipped with a horizontally disposed rack segment 86 having on its larger circumference a horizontally extending plain surfaced segmental track 88. This track is traversed on its upper surface by two separated rollers 90 journalled on opposite sides of frame 20, as clearly shown in Figure 6. The under side of this track 88 is traversed by another roller 92 operatively suspended from the frame 20 by a bracket 94, this also shown in Figure 6, the result being that track 88 and consequently rack 86 is always held in the same relative position with reference to the two frames 16 and 20 regardless of the horizontal angular position of either frame with reference to the other. This construction just described insures that beveled gear 96, operatively mounted on shaft 98, journaled in brackets 100 and 102, carried by frame 20, will always be in proper mesh with the teeth of said rack 86.

Shaft 98 and consequently bevel gear 96 is manually rotatable through a conventional train of gearing comprising worm wheel 104, worm 106, bevel gear 108 and bevel gear 110, operatively mounted on shaft 112, connected through universal joint 114 to the rearwardly extending shaft 116, rotatable through manual manipulation of hand wheel 118 at the operator's station. From the construction described, it is obvious that the operator from station 26 can by rotating hand wheel 118 in the proper direction force bevel gear 96 to traverse rack 86 thereby turning the power plant on vertical column or pivot 54 of the frame and steering the machine, except as the same is affected by independent control of the rear wheels 22, as hereinafter described.

The side members of frame 20 are interconnected behind the steering mechanism described by a depending bracket 120. Suitably connected to the lower portion of this bracket by universal joint 122 is a conventional form of tool carrying floating frame 124 having transversely extending across its center bar 126, to each extreme end of which is attached a vertically extending rod 127 to whose upper end is pivotally attached a crank pin 128 on a crank arm 130, rotatable by a horizontally extending shaft 132 manipulatable through a conventional gearing 134 by an independent hand wheel 136, there being as shown one such wheel on each side of the operator at his station 26 so that by properly conventionally manipulating these hand wheels 136, the operator can conventionally raise or lower either side of the frame 124 and consequently correspondingly manipulate the outer ends of the road working blade 24, heretofore referred to.

Connected to the rear end of frame 124 by a horizontal pivot 138, permitting rocking in a vertical plane only, is a rearwardly extending, supplemental frame 140, having a longitudinally telescoping end member 142 (Figure 10) connected by a vertically disposed pivot 144 to a transversely reciprocal cross-head 146 movable along a guide bar 148 rigidly secured across frame 20 by any suitable means, such for instance as shown in Figure 10. This cross-head is reciprocal transversely of the frame 20 by any suitable means manipulatable by the operator at his station 26. The particular form of mechanism shown includes a chain 150 traversing a pair of sprocket wheels 152 located at opposite ends of bar 148, one of said wheels being manipulated by a vertical shaft 154 connected through a universal joint 156 with upwardly extending shaft 158, manipulatable by hand wheel 160 convenient to the operator's station 26. By properly manipulating this hand wheel 160, the operator can move cross-head 146 crosswise of frame 20, as desired, to laterally angularly position floating frame 120, and consequently correspondingly position blade 24.

On the under side of floating frame 124 is a conventionally formed, horizontally rotatable tool carrying wheel 162 sustaining through depending brackets 164 the road working blade 24. This wheel 162 is conventionally embraced by a sprocket chain 166 traversing a sprocket wheel 168 mounted on a vertical shaft 170 conventionally, operatively connected through worm gear mechanism 172 and universal joint 174 to diagonal shaft 176, manipulatable at the operator's station by hand wheel 178. By properly rotating this wheel 178, the operator at his station 26 rotates sprocket gear 168 in either direction, as desired, thereby through chain 166 rotating wheel 162 and consequently horizontally angularly positioning blade 24.

While worm gear mechanism 172 operates in the absence of rotation of wheel 176 as a lock to hold blade 24 in predetermined, angular position, this lock is not sufficiently strong to resist the severe strains upon blade 24 occurring in actual work so a conventional form of swinging lock lever 180, not shown in detail, is provided inside of circle 162, said lever being conventionally automatic in its locking effect and releasable by the operator at his station through conventional manipulation of foot lever 182, conventionally, operatively connected to lever 180 through rod 184, lever 186 and rod 188. When the operator wants to manipulate wheel 178 to angularly position the blade, he first presses upon foot pedal 182 and releases lock 180.

Rear wheels 22 are rollingly rotated on short stub shafts 190, each in turn rockably mounted on horizontal pins or shafts 192 extending lengthwise of the frame 20 located on transverse rear axle 194. Rigidly connected to each stub shaft 190 is a vertically extending lever 196 and the two ends of these levers 196 are connected together by a horizontally disposed and reciprocal bar 198. Bar 198 carries a conventional gear segment 200 meshing with a pinion 202 on a shaft 204, carrying a worm wheel 206, in turn meshing with a vertical worm 208 on a vertical shaft 210 entering through a universal joint 212 the body of frame 20. The upper end of this shaft 210 is connected through a universal joint 214 with a journaled, vertically disposed shaft 216, manually manipulatable by hand wheel 218. The result of the construction just described is that the operator can by rotating hand wheel 218, rotate pinion 202 to drive segmental gear 200 across it and thus angularly, vertically incline wheels 22 with reference to shaft 194 and this can be done regardless of the inclination in a vertical plane of shaft 194 permitted through the presence of universal joint 212.

Universal joint 212 permits in addition the rotation of shaft 192 in a horizontal plane about the vertical axis of shaft 210. This is powerfully accomplished by rigidly attaching to shaft 192 segmental frame 218 carrying rack segment 220 conventionally manipulatable through bevel gear 222, shaft 224, worm wheel 226, worm 228, vertical shaft 230 and hand wheel 232 located adjacent to the operator's station. Manual manipulation of this hand wheel 232 causes pinion 222 to traverse rack 220 and thus angularly turn wheels 22 about vertical pivot 210 thus independently steering the rear wheels 22 regardless of what may be done in the matter of steering the power plant with reference to the front end of the frame 20. In other words, this device has independent front and rear steering mechanisms, in general terms analogous to such steering capacity conventionally present in hook and ladder fire apparatus, etc.

Owing to the fact that the operator can thus independently steer the front and rear wheels, it is possible for him to hold the machine in the position shown in Figure 3 with the power plant up in the road, the rear wheels down in the ditch, and the blade cutting ditch line 234. All of the independent adjustments of the blade referred to, viz, bodily moving the blade transversely of the frame 20; raising or lowering either end; angularly tilting the blade in a horizontal plane, materially add to the accuracy of the work which can be done by the machine, and placing all of the controls, including the clutch of the engine and the gear shifts at the rear of the machine enables one man to manipulate the machine to do the work which would be required of several men or several machines under previous practice. The fact that the power plant is at the front of the machine does away with the tendency to push the blade deeper and deeper into the bank, which is present in all machines of the prior art in which a power plant is used, which tendency has to be constantly fought by the operator of such prior machines.

To make the significance of ditch line 234 clear, a section of the ditch and road is indicated at 236—238 in Figure 3.

One special feature of the invention lies in the fact that the power plant, which involves more or less delicate machinery, is always up in the road out of the reach of ditch moisture, etc., which may reach the power plant of a rear power plant grader,—thus insuring better traction than is possible in the average ditch which feature is one of great value from the standpoint of utility, it being obvious that the machine of this invention because of the position of the power plant will, with a given load, proceed with less slipping and therefore with more speed than any heretofore known.

Having thus described my invention, what I claim as new and desire to secure by Letters Patent is:

1. In a road grader, in combination front and rear wheels, a power plant sustained by the front wheels, a frame intermediate between the front and rear wheels, a pivotal steering connection between the power plant and the frame, a road-working blade, adjustably mounted and positioned below the frame, and manually manipulated means at a single point on the machine remote from the power plant for controlling the power plant, steering the device, and adjusting the blade.

2. In a road grader, in combination, two front and two rear wheels only, a power plant sustained by the front wheels, a frame intermediate between the front and rear wheels, a pivotal steering connection between the power plant and the frame, a road-working blade adjustably mounted and positioned below the frame, and manually manipulatable means at a single point on the machine remote from the power plant for controlling the power plant, steering the device, and adjusting the blade.

3. In a road grader, in combination, front and rear wheels, a power plant sustained by the front wheels, a frame intermediate between the front and rear wheels, a pivotal steering connection between the power plant and the frame, a steering connection between the rear wheels and frame, a road-working blade adjustably mounted below the frame, and manually manipulatable means at a single point on the machine remote from the power plant for controlling the power plant, steering the device both front and rear, and adjusting the blade.

4. In a road grader, in combination, two front and two rear wheels only, a power plant sustained by the front wheels, a frame intermediate between the front and rear wheels, a pivotal steering connection between the power plant and the frame, a steering connection between the rear wheels and frame, a road-working blade adjustably mounted below the frame, and manually manipulatable means at a single point on the machine remote from the power plant for controlling the power plant, steering the device and adjusting the blade.

5. In a road grader, in combination front and rear wheels, a power plant sustained by the front wheels, a frame intermediate between the front and rear wheels, a pivotal steering connection between the power plant and the frame, a road-working blade, adjustably mounted below the frame, manually manipulated means at a single point on the machine remote from the power plant for controlling the power plant, steering the device, and adjusting the blade, means inclining the rear wheels in vertical planes and means within reach of the operator at said single position for so inclining said wheels.

6. In a road grader, in combination, two front and two rear wheels only, a power plant sustained by the front wheels, a frame intermediate between the front and rear wheels, a pivotal steering connection between the power plant and the frame, a road-working blade adjustably mounted below the frame, manually manipulatable means at a single point on the machine remote from the power plant for controlling the power plant, steering the device, and adjusting the blade, means inclining the rear wheels in vertical planes, and means within reach of the operator at said single position for so inclining said wheels.

7. In a road grader, in combination, front and rear wheels, a power plant sustained by the front wheels, a frame intermediate between the front and rear wheels, a pivotal steering connection between the power plant and the frame, a steering connection between the rear wheels and frame, a road-working blade adjustably mounted below the frame, and manually manipulatable means at a single point on the machine remote from the power plant for controlling the power plant, steering the device both front and rear, and adjusting the blade, means inclining the rear wheels in vertical planes and means within reach of the operator at said single position for so inclining said wheels.

8. In a road grader, in combination, two front and two rear wheels only, a power plant sustained by the front wheels, a frame intermediate between the front and rear wheels, a pivotal steering connection between the power plant and the frame, a steering connection between the rear wheels and frame, a road-working blade adjustably mounted below the frame, manually manipulatable means at a single point on the machine remote from the power plant for controlling the power plant, steering the device and adjusting the blade, means inclining the rear wheels in vertical planes and means within reach of the operator at said single position for so inclining said wheels.

9. In a road grader, in combination front and rear wheels, a power plant sustained by the front wheels, a frame intermediate between the front and rear wheels, a pivotal steering connection between the power plant and the frame, a road-working blade, adjustably mounted below the frame for vertical angular adjustment, horizontal angular adjustment, bodily movement crosswise of the frame, and manually manipulated means at a single point on the machine remote from the power plant for controlling the power plant, steering the device, and making each of the blade adjustments.

10. In a road grader, in combination, two front and two rear wheels only, a power plant sustained by the front wheels, a frame intermediate between the front and rear wheels, a pivotal steering connection between the power plant and the frame, a road-working blade adjustably mounted below the frame for vertical angular adjustment, horizontal angular adjustment, bodily movement crosswise of the frame, and manually manipulatable means at a single point on the machine remote from the power plant for controlling the power plant, steering the device, and making each of the blade adjustments.

11. In a road grader, in combination, front and rear wheels, a power plant sustained by the front wheels, a frame intermediate between the front and rear wheels, a pivotal steering connection between the power plant and the frame, a steering connection between the rear wheels and frame, a roadworking blade adjustably mounted below the frame for vertical, angular adjustment, horizontal angular adjustment, bodily movement crosswise of the frame, and manually manipulatable means at a single point on the machine remote from the power plant for controlling the power plant, steering the device both front and rear, and making each of the blade adjustments.

12. In a road grader, in combination, two front and two rear wheels only, a power plant sustained by the front wheels, a frame intermediate between the front and rear wheels, a pivotal steering connection between the power plant and the frame, a steering connection between the rear wheels and frame, a road-working blade adjustably mounted below the frame for vertical angular adjustment, horizontal angular adjustment, bodily movement crosswise of the frame, and manually manipulatable means at a single point on the machine remote from the power plant for controlling the power plant, steering the device and making each of the blade adjustments.

13. In a road grader, in combination front and rear wheels, a power plant sustained by the front wheels, a frame intermediate between the front and rear wheels, a pivotal steering connection between the power plant and the frame, a road-working blade, adjustably mounted below the frame for vertical, angular adjustment, horizontal angular adjustment, bodily movement crosswise of the frame; manually manipulated means at a single point on the machine remote from the power plant for controlling the power plant, steering the device and making each of the blade adjustments, means inclining the rear wheels in vertical planes and means within reach of the operator at said single position for so inclining said wheels.

14. In a road grader, in combination, two front and two rear wheels only, a power plant sustained by the front wheels, a frame intermediate between the front and rear wheels, a pivotal steering connection between the power plant and the frame, a road-working blade adjustably mounted below the frame for vertical angular adjustment, horizontal, angular adjustment, bodily movement crosswise of the frame, manually manipulatable means at a single point on the machine remote from the power plant for controlling the power plant, steering the device, and making each of the blade adjustments, means inclining the rear wheels in vertical planes, and means within reach of the operator at said single position for so inclining said wheels.

15. In a road grader, in combination, front and rear wheels, a power plant sustained by the front wheels, a frame intermediate between the front and rear wheels, a pivotal steering connection between the power plant and the frame, a steering connection between the rear wheels and frame, a road-working blade adjustably mounted below the frame for vertical, angular adjustment, horizontal angular adjustment, bodily movement crosswise of the frame, manually manipulatable means at a single point on the machine remote from the power plant for controlling the power plant, steering the device both front and rear, and making each of the blade adjustments, means inclining the rear wheels in vertical planes, and means within reach of the operator at said single position for so inclining said wheels.

16. In a road grader, in combination, two front and two rear wheels only, a power plant sustained by the front wheels, a frame intermediate between the front and rear wheels, a pivotal steering connection between the power plant and the frame, a steering connection between the rear wheels and frame, a road-working blade adjustably mounted below the frame for vertical angular adjustment, horizontal angular adjustment, bodily movement crosswise of the frame, manually manipulatable means at a single point on the machine remote from the power plant for controlling the power plant, steering the device and making each of the blade adjustments, means inclining the rear wheels in vertical planes, and means within reach of the operator at said single position for so inclining said wheels.

17. A machine of the class described, a front power plant for traversing a road to be worked, a pair of distant rear wheels independently steerable to traverse a ditch by said road, a frame attached to said rear wheels and pivotally connected to the power plant, a working blade carried on a floating frame pivoted to the first frame behind the power plant, and means bodily swinging said floating frame and blade crosswise of the machine for the purposes set forth.

In witness whereof, I have hereunto subscribed my name.

FRED D. WILSON.